3,144,467
METHOD OF PREPARATION OF ALKYLATED DIHYDROCOUMARINS
William J. Houlihan, Colonia, N.J., assignor to Universal Oil Products Company, Des Plaines, Ill., a corporation of Delaware
No Drawing. Filed July 16, 1962, Ser. No. 210,244
11 Claims. (Cl. 260—343.2)

This invention relates to new compositions of matter comprising alkylated coumarins and particularly polyalkylated dihydrocoumarins. More specifically, the invention is concerned with these new compositions of matter and to a method for the preparation thereof.

It has now been discovered that certain new compositions of matter comprising polyalkylated dihydrocoumarins may be prepared by condensing an alkylating agent with a dihydrocoumarin in the presence of an acid catalyst. These polyalkylated dihydrocoumarins will find a wide variety of uses in the chemical field, especially as aroma chemicals which may be used as essences in the perfume and soap industry. For example, diisopropyl-3,4-dihydrocoumarin possesses a powerful long lasting Astratone-musk odor and, therefore, may be blended into formulations which require such an odor, said formulations being used to scent soap, talcums or in various perfumes or colognes. As is well known in the perfume and aroma art, natural musk is relatively expensive and difficult to obtain in large quantities which are necessary for the industry. Therefore, the price of natural musk is relatively high and any synthetic chemical which possesses this odor and which may be obtained in a relatively inexpensive manner by utilizing easy-to-obtain starting materials, would become a welcome and much used substitute for the natural musk. However, the synthetic musk must possess a powerful odor which must remain for a long time and not lose the intensity, thereby rendering the soap or perfume into which said synthetic musk is blended bland and unimaginative.

It is therefore an object of this invention to provide a process for obtaining reaction products which possess desirable odors and aromas.

Another object of this invention is to provide a process for preparing new compositions of matter which are useful in the perfume and aroma industry.

Taken in its broadest aspect one embodiment of this invention resides in a process for the preparation of an alkylated dihydrocoumarin which comprises condensing a dihydrocoumarin with an alklating agent at alkylation conditions in the presence of an acid catalyst, and recovering the resultant alkylated dihydrocoumarin.

A further embodiment of this invention is found in a process for the preparation of polyalkylated dihydrocoumarin which comprises condensing a dihydrocoumarin with isopropyl alcohol at a temperature in the range of from about 0° to about 80° C. in the presence of an acid catalyst, and recovering the resultant polyalkylated dihydrocumarin.

Yet another embodiment of this invention is found in a process for the preparation of polyalklated dihydrocoumarin which comprises condensing a dihydrocoumarin with an alkylating agent at a temperature in the range of from about 0° to about 80° C. in the presence of phosphoric acid, and recovering the resultant polyalkylated dihydrocoumarin.

A specific embodiment of this invention is found in a process for the preparation of polyalkylated dihydrocoumarin which comprises condensing dihydrocoumarin with isopropyl alcohol at a temperature in the range of from about 0° to about 80° C. in the presence of polyphosphoric acid, and recovering the resultant diisopropyl-3,4-dihydrocoumarin.

Another specific embodiment of this invention is di-t-butyl-3,4-dihydrocoumarin.

Other objects and embodiments will be found in the following further detailed description of this invention.

As hereinbefore set forth, it has now been discovered that new compositions of matter comprising alkylated dihydrocoumarins and particularly di- and tri-alkylated dihydrocoumarins which possess pleasant and useful odors, and which may be utilized as blending agents in perfumes or soaps, may be prepared by alkylating dihydrocoumarins with certain alkylating agents in the presence of an acid catalyst. The term "alkylated dihydrocoumarins" as used in the specification and appended claims will be meant to include monoalkylated, polyalkylated and cyclo-alkylated dihydrocoumarins, said polyalkylated dihydrocoumarins containing alkyl substituents on benzenoid ring of the dihydrocoumarin system. Dihydrocoumarins which may be utilized in the process of this invention possess the generic formula:

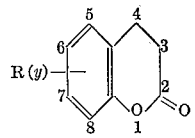

in which R is a radical selected from the group consisting of alkyl radicals containing from 1 to about 5 carbon atoms, cycloalkyl radicals, aryl radicals, alkaryl radicals, aralkyl radicals and hydrogen, and y is an integer of from 1 to 3. Examples of these dihydrocoumarins include 3,4-dihydrocoumarin,
5-methyl-3,4-dihydrocoumarin,
5-ethyl-3,4-dihydrocoumarin,
5-phenyl-3,4-dihydrocoumarin,
5-benzyl-3,4-dihydrocoumarin,
6-methyl-3,4-dihydrocoumarin,
6-ethyl-3,4-dihydrocoumarin,
6-phenyl-3,4-dihydrocoumarin,
6-benzyl-3,4-dihydrocoumarin,
7-methyl-3,4-dihydrocoumarin,
7-ethyl-3,4-dihydrocoumarin,
7-phenyl-3,4-dihydrocoumarin,
7-benzyl-3,4-dihydrocoumarin,
8-methyl-3,4-dihydrocoumarin,
8-ethyl-3,4-dihydrocoumarin,
8-phenyl-3,4-dihydrocoumarin,
8-benzyl-3,4-dihydrocoumarin, etc.

The alkylating agents which are used to alkylate the aforesaid dihydrocoumarins may comprise olefins containing at least 1 ethylenic linkage and containing only carbon and hydrogen atoms such as ethylene, propylene, 1-butene, 2-butene, 1-pentene, 2-pentene, etc.; mono-ols and diols, both straight chain and cyclic such as methyl alcohol, ethyl alcohol, n-propyl alcohol, isopropyl alcohol, n-butyl alcohol, t-butyl alcohol, n-amyl alcohol, isoamyl alcohol, n-hexyl alcohol, methyl ethyl carbinol, methyl propyl carbinol, methyl isopropyl carbinol, methyl butyl carbinol, methyl isobutyl carbinol, cyclopentanol, cyclohexanol, cycloheptanol, butane, 1,4-diol, pentane-1,4-diol, 4-alkylpentane-1,4-diols such as 4-methyl-pentane-1,4-diol, 4-ethylpentane-1,4-diol, hexane-2,5-diol, 2-alkylhexance-2,5-diols such as 2-methylhexane-2,5-diol, 2-ethylhexane-2,5-diol, 2,5-dialkylhexane-2,5-diols such as 2,5-dimethylhexane-2,5-diol, 2,5-diethylhexane-2,5-diol, etc.; ethers, both straight chain and some cyclic, such as dimethyl ether, diethyl ether, dipropyl ether, dibutyl ether, methylethyl ether, methylpropyl ether, methylbutyl ether, methylisobutyl ether, ethylpropyl ether, 2-alkyl-, 2,2-dialkyl-, 2,5-dialkyl-, 2,2,5-trialkyl- and the 2,2,5,5-tetraalkyltetrahydrofurans such as 2-methyltetrahydrofuran, 2,2-dimethyltetrahydrofuran, 2,2,5-trimethyltetrahydrofuran, 2,2,5,5-tetramethyltetrahydrofuran, etc. It is to be understood that the aforementioned dihydrocoumarins and alkylating agents are only representatives of the class of compounds which may be used and that the present process is not necessarily limited thereto.

The alkylation of the dihydrocoumarin is usually effected at a temperature in the range of from about 0° to about 80° C. in the presence of an acid catalyst. However, not all acids may be utilized as catalysts in the present invention inasmuch as it has been found that the presence of water in the reaction system is, in some instances, detrimental in obtaining the desired reaction product in commercially attractive yields and with a relatively high degree of purity. Therefore, it is necessary to use nearly anhydrous acids, not more than about 5% water being tolerated in the catalyst system. Examples of acids which may be used include concentrated sulfuric acid, polyphosphoric acid, tetraphosphoric acid, triphosphoric acid, pyrophosphoric acid, chlorosulfonic acid, etc., inert alkyl sulfonic and alkyl phosphonic acids such as methylsulfonic acid, ethylsulfonic acid, propylsulfonic acid, butylsulfonic acid, methylphosphonic acid, ethylphosphonic acid, propylphosphonic acid, butylphosphonic acid, etc.

The process of the present invention may be effected in any suitable manner and may comprise either a batch or continuous type operation. For example, when a batch type operation is used, a quantity of the acid catalyst is placed in an appropriate apparatus and heated or cooled to the desired reaction temperature, said reaction temperature depending upon the type of catalyst which is utilized in the process. Following this, a solution of the starting materials comprising a dihydrocoumarin and an alkylating agent of the type hereinbefore set forth is added at such a rate so that the internal temperature of the reaction mixture does not vary from the predetermined position. Following completion of the addition the reaction mixture is stirred while maintaining the reaction temperature. Following completion of the desired residence time the reaction mixture is allowed to return to a room temperature and the reaction product is recovered by conventional means such as, for example, by fractional distillation, crystallization, etc.

It is also contemplated within the scope of this invention that the reaction may be effected in a continuous manner, although not necessarily with equivalent results. For example, when a continuous type operation is used, a quantity of the catalyst is placed in a reactor which may comprise a vessel or coil, said reactor being maintained at the proper operating conditions of temperature and pressure. In the preferred embodiment of the invention, when utilizing either a batch or continuous operation, the reaction is effected at atmospheric pressure although superatmospheric pressures may be used to maintain a major portion of the reactants in the liquid phase, said pressure being provided by the introduction of an inert gas such as nitrogen into the reaction vessel. The starting materials comprising a dihydrocoumarin and alkylating agent are continuously charged to the reactor through separate means, or if so desired, may be admixed prior to entry into said reactor and charged thereto in a single stream, the rate of addition being so controlled as to maintain the operating temperature of the reaction within a predetermined range. Upon completion of the desired residence time in the reactor which may be so controlled, the reaction products are continuously withdrawn from the reactor, the desired product being recovered by conventional means hereinbefore set forth while the unreacted starting material will be recycled to the reactor to form a portion of the feed stock.

Examples of alkylated isomeric dihydrocoumarins which may be prepared according to the process of this invention include 6,8-dimethyl-3,4-dihydrocoumarin,
5,7-dimethyl-3,4-dihydrocoumarin,
5,6,8-trimethyl-3,4-dihydrocoumarin,
6,8-diethyl-3,4-dihydrocoumarin,
5,7-diethyl-3,4-dihydrocoumarin,
5,6,8-triethyl-3,4-dihydrocoumarin,
6,8-di-n-propyl-3,4-dihydrocoumarin,
5,7-di-n-propyl-3,4-dihydrocoumarin,
5,6,8-tri-n-propyl-3,4-dihydrocoumarin,
6,8-diisopropyl-3,4-dihydrocoumarin,
5,7-diisopropyl-3,4-dihydrocoumarin,
5,6,8-triisopropyl-3,4-dihydrocoumarin,
5,7-di-n-butyl-3,4-dihydrocoumarin,
6,8,-di-n-butyl-3,4-dihydrocoumarin,
5,6,8-tri-n-butyl-3,4-dihydrocoumarin,
6,8,-di-t-butyl-3,4-dihydrocoumarin,
5,7-di-t-butyl-3,4-dihydrocoumarin,
5,6,8-tri-t-butyl-3,4-dihydrocoumarin,
5,7-dipentyl-3,4-dihydrocoumarin,
6,8-dipentyl-3,4-dihydrocoumarin,
6,8-dihexyl-3,4-dihydrocoumarin,
5,7-dihexyl-3,4-dihydrocoumarin,
5,6,8-trihexyl-3,4-dihydrocoumarin,
5,7-diheptyl-3,4-dihydrocoumarin,
6,8-diheptyl-3,4-dihydrocoumarin,
5,7-dicyclopentyl-3,4-dihydrocoumarin,
6,8-dicyclopentyl-3,4-dihydrocoumarin,
5,7-dicyclohexyl-3,4-dihydrocoumarin,
6,8-dicyclohexyl-3,4-dihydrocoumarin,
6,8-dicycloheptyl-3,4-dihydrocoumarin,
5,7-dicycloheptyl-3,4-dihydrocoumarin,
5-methyl-6,7-diisopropyl-3,4-dihydrocoumarin,
5-methyl-6,8-diisopropyl-3,4-dihydrocoumarin,
5-ethyl-6,7-diisopropyl-3,4-dihydrocoumarin,
5-ethyl-6,8-diisopropyl-3,4-dihydrocoumarin,
5-methyl-6,7-di-t-butyl-3,4-dihydrocoumarin,
5-methyl-6,8-di-t-butyl-3,4-dihydrocoumarin,
5-ethyl-6,7-di-t-butyl-3,4-dihydrocoumarin,
5-ethyl-6,8-di-t-butyl-3,4-dihydrocoumarin,
6,8-diisopropyl-7-methyl-3,4-dihydrocoumarin,
5,8-diisopropyl-7-methyl-3,4-dihydrocoumarin,
6,8-diisopropyl-7-ethyl-3,4-dihydrocoumarin,
5,8-diisopropyl-7-ethyl-3,4-dihydrocoumarin,
6,7,-diisopropyl-8-methyl-3,4-dihydrocoumarin,
5,7-diisopropyl-8-ethyl-3,4-dihydrocoumarin,
6,8,-di-t-butyl-7-methyl-3,4-dihydrocoumarin,
5,8-di-t-btuyl-7-ethyl-3,4-dihydrocoumarin,
5,6-[1,1,4,4-tetramethyltetramethylene]-3,4-dihydrocoumarin,
7,8-[1,1,4,4-tetramethyltetramethylene]-3,4-dihydrocoumarin,
5,6-[1,1,4,4-tetraethyltetramethylene]-3,4-dihydrocoumarin,
7,8-[1,1,4,4-tetraethyltetramethylene]-3,4-dihydrocoumarin.

The following examples are given to illustrate the process of the present invention which, however, are not intended to limit the generally broad scope of the present invention in strict accordance therewith.

*Example I*

In this example 750 grams of polyphosphoric acid was added to an alkylation flask provided with heating and stirring means. The acid was stirred while being heated to a temperature of about 75° C. Following this a solution of 55.5 grams (0.75 mole) of t-butyl alcohol and 37 grams (0.25 mole) of 3,4-dihydrocoumarin was added dropwise with continuous stirring at such a rate so that the internal temperature of the reaction mixture did not exceed 80° C. During this dropwise addition of the solution the acid fraction changed from colorless to yellow and then to orange. Upon completion of the addition of the solution which took approximately 1 hour, the mixture continued to be stirred and maintained at a temperature of 80° C. for an additional period of 1 hour. Following this stirring was discontinued and the reaction mixture was allowed to cool to room temperature and remain at said temperature for a period of about 16 hours. At the end of this time the viscous, orange-brown solution, was slowly poured onto 1 liter of ice and water and then stirred for approximately 0.25 hour. The organic material was separated from the water, extracted with ether, washed with 10% sodium carbonate and dried using magnesium sulfate. The resulting mixture was filtered and the ether removed in vacuum on a rotary evaporator. The residue which remained was distilled through a 36″ spinning band column. The fractional distillation under reduced pressure resulted in obtaining 13.4 grams of unreacted starting material; an intermediate fraction boiling in a range of 88° to 127° C. at 2 mm. pressure; and 27.3 grams of mainly 6,8-di-t-butyl-3,4-dihydrocoumarin with a minor amount of 8-t-butyl-3,4-dihydrocoumarin having a boiling point of 128°–134° C. at 2 mm. pressure and a refractive index of $n_D^{20}$ 1.5284–1.5341. The product was subjected to infrared analysis which disclosed a characteristic unconjugated lactone carbonyl band at 5.63–5.73$\mu$ and t-butyl bands at 7.31 and 7.48$\mu$. The molecular weight as determined by ester titration was 276.

*Example II*

In this example 750 grams of polyphosphoric acid was added to an alkylation flask provided with heating and stirring means and was heated to about 75° C. while stirring constantly. A solution of 45 grams (0.75 mole) of isopropyl alcohol and 37 grams (0.25 mole) of 3,4-dihydrocoumarin was slowly added dropwise with constant stirring at such a rate so that the internal temperature did not exceed 80° C. During the addition of the solution the acid fraction changed from colorless to yellow. Upon completion of the addition of the solution which took about 1 hour the mixture was stirred and maintained at a temperature of about 80° C. for an additional hour. Following this the stirring was discontinued, the reaction mixture allowed to return to room tempertaure and remain at this temperature for a period of 16 hours. At the end of this time the viscous orange solution was poured onto 1 liter of ice and water and stirred for about 0.25 hour. The organic material was separated from the water layer, extracted with ether, washed with a 10% sodium carbonate solution and dried with magnesium sulfate. The mixture was then filtered and the ether removed in vacuum on a rotary evaporator. The residue which remained was subjected to fractional distillation under reduced pressure through a 36″ spinning band column which allowed the fractions to be recovered in sharper cuts. The distillation resulted in obtaining 7.5 grams of unreacted starting material and 39.2 grams of mainly 6,8- and 5,7-diisopropyl-3,4-dihydrocoumarin with a minor amount of 6-isopropyl-3,4-dihydrocoumarin which had a boiling point in the range of 128°–141° C. at 2 mm. pressure and a refractive index of $n_D^{20}$ 1.5269–1.5281. The aforementioned alkylated dihydrocoumarin was subjected to infrared analysis which disclosed a characteristic unconjugated lactone carbonyl at 5.63–5.73$\mu$ and isopropyl bands at 7.23 and 7.33$\mu$.

*Example III*

In this example 960 grams of concentrated sulfuric acid was added to an alkylation flask provided with stirring means and immersed in an ice bath. The acid was stirred and cooled to an internal temperature of 15° C. A solution of 180 grams (3.0 mole) of isopropyl alcohol and 222 grams (1.5 moles) of 3,4-dihydrocoumarin was added dropwise with continuous stirring at such a rate so that the internal temperature did not exceed 15° C. During the addition period the acid fraction changed from colorless to yellow. Upon completion of the addition the ice cooling bath was removed and the reaction was stirred for an additional 9 hours. The reaction mixture was then allowed to stand at room temperature for a period of about 48 hours, following which the orange-red solution was slowly poured onto 1.5 kilograms of ice and water and then stirred for about 0.25 hour. The organic material was separated from the water, extracted with benzene, washed with 10% sodium carbonate solution and dried with magnesium sulfate. The mixture was filtered and the filtrate subjected to removal of the benzene in vacuum on a rotary evaporator. Following this the residue was subjected to fractional distillation in a manner similar to that set forth above, there being recovered mainly 6,8-diisopropyl-3,4-dihydrocoumarin with a minor amount of 8-isopropyl-3,4-dihydrocoumarin having a boiling point in the range of 147°–150° C. at 2 mm. pressure and a refractive index of $n_D^{20}$ 1.5272–1.5281. The desired product was subjected to infrared analysis which disclosed a characteristic unconjugated lactone carbonyl band at 5.63–5.73$\mu$ and isopropyl bands at 7.23 and 7.33$\mu$.

*Example IV*

In this example 480 grams of concentrated sulfuric acid was added to an alkylation flask provided with stirring means and immersed in an ice bath. The acid was stirred while being cooled to an internal temperature of about 150° C. A solution of 150 grams (1.5 moles) of cyclohexanol and 111 grams (0.75 mole) of 3,4-dihydrocoumarin was slowly added with continuous stirring at such a rate so that the internal temperature did not exceed 15° C. During the addition of the solution the acid fraction changed from colorless to an orange viscous. The ice bath was removed upon completion of the addition and the reaction was stirred at room temperature for a period of 7.5 hours, then allowed to remain at room temperature for a period of 16 hours. Following this the reddish-brown solution was slowly poured onto 1 kilogram of ice-water. The organic material was separated from the water layer, extracted with benzene, washed with 10% sodium carbonate and thereafter dried with magnesium sulfate. The mixture was filtered and the benzene removed in vacuum. The residue was then subjected to fractional distillation under reduced pressure there being obtained 48.4 grams of mainly 6,8-dicyclohexyl-3,4-dihydrocoumarin with a minor amount of 5,7-dicyclohexyl-3,4-dihydrocoumarin having a boiling point in the range of 149°–153° C. at 2 mm. pressure and a refractive index of $n_D^{20}$ 1.5520–1.5531. Infrared analysis of the reaction disclosed a characteristic unconjugated lactone carbonyl band at 5.62–5.72$\mu$.

*Example V*

In this example 480 grams of concentrated sulfuric acid was added to an alkylation flask provided with stirring means, said flask being immersed in an ice bath. The acid was stirred and cooled to an internal temperature of 15° C. A solution of 153 grams (1.5 mole) of methylisobutyl carbinol and 111 grams (0.75 mole) of 3,4-dihydrocoumarin was then added dropwise with continuous stirring of the acid at such a rate so that the internal temperature did not exceed 15° C. During the addition of the solution the acid fraction changed from colorless to yellow and finally to orange. Upon completion of the addition the ice cooling was removed and the reaction mixture was stirred at room temperature for an additional period of 6.5 hours. Following this the mixture was allowed to stand for a period of 16 hours at room temperature, then slowly poured onto 1 kilogram of ice-water. The organic material was separated from the water layer, extracted with benzene, washed with 10% sodium carbonate and thereafter dried with magnesium sulfate. The mixture was filtered and the benzene removed, following which the mixture was subjected to fractional distillation under reduced pressure. After removal of low boiling hydrocarbon fractions and some unreacted dihydrocoumarins, there was obtained 75.2 grams of mainly 6,8-diisohexyl-3,4-dihydrocoumarin having a boiling point in the range of 145°–187° C. and having a refractive index of $n_D^{20}$ 1.5250–1.5218. Infrared analysis of this product coupled with an odor analysis disclosed that the fraction was contaminated with some hydrocarbon, presumably a $C_6$ trimer. In order to remove this material, the product was stirred with a solution comprising 60 grams of potassium hydroxide and 500 cc. of methanol, the temperature being maintained at approximately 25° C. The resulting solution was then extracted with hexane and acidified with concentrated hydrochloric acid. The organic material was extracted with benzene and dried. Fractional distillation under reduced pressure resulted in the obtention of 59 grams of mainly 6,8-dihexyl-3,4-dihydrocoumarin with a minor amount of 8-hexyl-3,4-dihydrocoumarin having a boiling point of 172°–170° C. at 5 mm. pressure and a refractive index of $n_D^{20}$ 1.5328. This material was then subjected to infrared analysis which disclosed a characteristic unconjugated lactone carbonyl band at 5.63–5.73$\mu$.

*Example VI*

In this example polyphosphoric acid is placed in an alkylation flask provided with heating and stirring means and heated to a temperature of about 75° C. with constant stirring. A solution of 55.5 grams (0.75 mole) of n-butyl alcohol and 37 grams (0.25 mole) of 3,4-dihydrocoumarin was slowly added dropwise at such a rate so that the internal temperature of the flask does not exceed 80° C., said addition being accompanied by constant stirring of the mixture. Upon completion of the addition which will take about 1 hour the mixture is continued to be stirred and maintained at a temperature of 80° C. for an additional 1 hour. Following this, stirring is discontinued and the reaction mixture is allowed to return to room temperature and is allowed to stand for an additional period of 16 hours. The viscous solution which results upon standing is then slowly poured over ice and stirred for an additional period of about 0.25 hour. The organic material is separated from the water layer, extracted with benzene, washed with sodium carbonate and dried with magnesium sulfate. The mixture is then filtered and the solvent removed in vacuum. The residue which remains is then subjected to fractional distillation under reduced pressure and the desired product comprising mainly 6,8-dibutyl-3,4-dihydrocoumarin with a minor amount of 5,7-dibutyl-3,4-dihydrocoumarin is recovered. Infrared analysis of the product will disclose a characteristic unconjugated lactone carbonyl band at 5.63–5.73$\mu$.

*Example VII*

In this example an alkylation flask provided with stirring means was immersed in an ice bath following which 700 grams of concentrated sulfuric acid was added thereto. The acid was stirred and cooled to an internal temperature of 15° C. and maintained thereat. At slurry of 146 grams (1.0 mole) of 2,5-dimethylhexane-2,5-diol and 74 grams (0.5 mole) of 3,4-dihydrocoumarin was slowly added portionwise with continuous stirring at such a rate so that the internal temperature of the reaction flask did not exceed 15° C. It was observed that during the period of addition of the slurry the acid fraction turned from colorless to a yellow color. Upon completion of the addition of the slurry the ice cooling bath was removed and the reaction mixture was stirred for an additional period of 5 hours. The mixture was then allowed to stand at room temperature for a period of about 16 hours following which the pale brown cooled solution was slowly poured onto 1.5 kilograms of ice and water and thereafter stirred for about 0.25 hour. The organic layer was taken up in benzene and separated from the water layer. Following this the mixture was washed with water and dried with magnesium sulfate. The mixture was filtered and the filtrate was subjected to removal of the benzene in vacuum on a rotary evaporator. The residue which remained was then subjected to fractional distillation in a manner similar to that set forth in the above examples, there being recovered 40 grams of mainly 5,6- and 7,8-[1,1,4,4-tetramethyltetramethylene]-3,4-dihydrocoumarin. This fraction had a boiling point in the range of from 160–185° C. at 3 mm. pressure and solidified on cooling to room temperature. The desired product was subjected to recrystallization from isopropyl alcohol, the final crystals having a melting point of 174.4–172° C. An infrared analysis disclosed a characteristic unconjugated lactone carbonyl band at 5.66$\mu$ and gem dimethyl bands at 7.25 and 7.36$\mu$.

*Example VIII*

A modern floral blend backed up by a Woody-Ionone combination has the following composition:

| | Parts |
|---|---|
| Diisopropyldihydrocoumarin | 5.00 |
| Vetivert acetate | 3.00 |
| Linzlyl acetate | 3.00 |
| Hydroxycitronellal | 12.00 |
| Phenylethyl alcohol | 2.00 |
| Citronellol | 3.00 |
| Linalool | 2.00 |
| Methyl gamma-ionone | 10.00 |
| Benzyl alcohol | 5.00 |
| Guaiac acetate | 1.50 |
| α-Amylcinnamic aldehyde | 1.00 |

I claim as my invention:

1. A process for the preparation of a polyalkylated dihydrocoumarin which comprises condensing a dihydrocoumarin with an alkylating agent selected from the group consisting of olefins, mono-ols, diols and ethers at a temperature in the range of from about 0° to about 80° C. in the presence of an acid alkylation catalyst selected from the group consisting of sulfuric, phosphoric, chlorosulfonic, alkyl sulfonic and alkyl phosphonic acids, and recovering the resultant polyalkylated dihydrocoumarin.

2. A process for the preparation of a polyalkylated dihydrocoumarin which comprises condensing a dihydrocoumarin with a butyl alcohol at a temperature in the range of from about 0° to about 80° C. in the presence of an acid alkylation catalyst selected from the group consisting of sulfuric, phosphoric, chlorosulfonic, alkyl sulfonic and alkyl phosphonic acids, and recovering the resultant polyalkylated dihydrocoumarin.

3. A process for the preparation of a polyalkylated dihydrocoumarin which comprises condensing a dihydrocoumarin with isopropyl alcohol at a temperature in the range of from about 0° to about 80° C. in the presence of an acid alkylation catalyst selected from the group consisting of sulfuric, phosphoric, chlorosulfonic, alkyl sulfonic and alkyl phosphonic acids, and recovering the resultant polyalkylated dihydrocoumarin.

4. A process for the preparation of a polyalkylated dihydrocoumarin which comprises condensing a dihydrocoumarin with cyclohexanol at a temperature in the range of from about 0° to about 80° C. in the presence of an acid alkylation catalyst selected from the group consisting of sulfuric, phosphoric, chlorosulfonic, alkyl sulfonic and alkyl phosphonic acids, and recovering the resultant polyalkylated dihydrocoumarin.

5. A process for the preparation of a polyalkylated dihydrocoumarin which comprises condensing a dihydrocoumarin with methyl isobutyl carbinol at a temperature in the range of from about 0° to about 80° C. in the presence of an acid alkylation catalyst selected from the group consisting of sulfuric, phosphoric, chlorosulfonic, alkyl sulfonic and alkyl phosphonic acids, and recovering the resultant polyalkylated dihydrocoumarin.

6. A process for the preparation of a polyalkylated dihydrocoumarin which comprises condensing 3,4-dihydrocoumarin with t-butyl alcohol at a temperature in the range of from about 0° to about 80° C. in the presence of polyphosphoric acid, and recovering the resultant mixture of 6,8-di-t-butyl-3,4-dihydrocoumarin and 5,7-di-t-butyl-3,4-dihydrocoumarin.

7. A process for the preparation of a polyalkylated dihydrocoumarin which comprises condensing 3,4-dihydrocoumarin with isopropyl alcohol at a temperature in the range of from about 0° to about 80° C. in the presence of polyphosphoric acid, and recovering the resultant mixture of 6,8-diisopropyl-3,4-dihydrocoumarin and 5,7-diisopropyl-3,4-dihydrocoumarin.

8. A process for the preparation of a polyalkylated dihydrocoumarin which comprises condensing 3,4-dihydrocoumarin with cyclohexanol at a temperature in the range of from about 0° to about 80° C. in the presence of sulfuric acid, and recovering the resultant mixture of 6,8-dicyclohexyl-3,4-dihydrocoumarin and 5,7-dicyclohexyl-3,4-dihydrocoumarin.

9. A process for the preparation of an polyalkylated dihydrocoumarin which comprises condensing 3,4-dihydrocoumarin with 2,5-dimethylhexane-2,5-diol at a temperature in the range of from about 0° to about 80° C. in the presence of sulfuric acid, and recovering the resultant mixture of 5,6-[1,1,4,4-tetramethyltetramethylene]-3,4-dihydrocoumarin and 7,8-[1,1,4,4-tetramethyltetramethylene]-3,4-dihydrocoumarin.

10. A process for the preparation of a polyalkylated dihydrocoumarin which comprises condensing 3,4-dihydrocoumarin with methyl isobutyl carbinol at a temperature in the range of from about 0° to about 80° C. in the presence of sulfuric acid, and recovering the resultant mixture of 5,7-dihexyl-3,4-dihydrocoumarin, 3,8-dihexyl-3,4-dihydrocoumarin, and 6,8-dihexyl-3,4-dihydrocoumarin.

11. A process for the preparation of diisopropyl dihydrocoumarin which comprises condensing 3,4-dihydrocoumarin with isopropyl alcohol at a temperature in the range of from about 0° to about 80° C. in the presence of an acid alkylation catalyst selected from the group consisting of sulfuric, phosphoric, chlorosulfonic, alkyl sulfonic and alkyl phosphonic acids, and recovering the resultant diisopropyl dihydrocoumarin.

References Cited in the file of this patent

UNITED STATES PATENTS 2,542,965    Levesque _____ Feb. 20, 1951

OTHER REFERENCES

Theilheimer: Syn. Meth. of Org. Chem. volume 10 (1956), page 478 (article No. 588) and page 483 (article No. 594).

Angeli et al.: Gazz. Chim. Ital., volume 61 (1931), pages 276–280.